United States Patent
Beyer

(10) Patent No.: US 9,282,698 B2
(45) Date of Patent: Mar. 15, 2016

(54) LIGHT EMITTING DIODE GROW LIGHT FOR PLANT GROWING APPLICATIONS

(71) Applicant: James H. Beyer, Ann Arbor, MI (US)

(72) Inventor: James H. Beyer, Ann Arbor, MI (US)

( * ) Notice: Subject to any disclaimer, the term of this patent is extended or adjusted under 35 U.S.C. 154(b) by 0 days.

(21) Appl. No.: 14/092,922

(22) Filed: Nov. 27, 2013

(65) Prior Publication Data
US 2014/0152194 A1    Jun. 5, 2014

Related U.S. Application Data

(60) Provisional application No. 61/796,978, filed on Nov. 27, 2012.

(51) Int. Cl.
*H05B 37/02* (2006.01)
*A01G 7/04* (2006.01)
*H05B 33/08* (2006.01)

(52) U.S. Cl.
CPC ............ *A01G 7/045* (2013.01); *H05B 33/0857* (2013.01); *H05B 37/02* (2013.01)

(58) Field of Classification Search
CPC ......... H05B 33/08; H05B 37/00; H05B 37/02
USPC .............................. 315/185 R, 291, 294, 312
See application file for complete search history.

(56) References Cited

U.S. PATENT DOCUMENTS

| | | | |
|---|---|---|---|
| 8,297,782 B2 * | 10/2012 | Bafetti | F21V 23/003 362/231 |
| 8,523,385 B2 * | 9/2013 | Lu et al. | 362/231 |
| 2003/0009933 A1 * | 1/2003 | Yoneda et al. | 47/1.01 R |
| 2004/0230102 A1 * | 11/2004 | Anderson, Jr. | A01G 7/045 600/231 |
| 2014/0069007 A1 * | 3/2014 | Chen | A01G 7/045 47/66.6 |

* cited by examiner

*Primary Examiner* — Tung X Le
(74) *Attorney, Agent, or Firm* — Mitchell M Musial, PLLC

(57) ABSTRACT

Disclosed herein is an apparatus and method for providing light to grow a plant. An LED array comprises blue light in a band between about 350 nm and 550 nm, red light in a band at about 630 nm and dark red light in a band at about 660 nm. An input device is provided for interrupting the dark red band at 660 nm in order to continue to provide light the plant while the plant continues to flower.

20 Claims, 1 Drawing Sheet

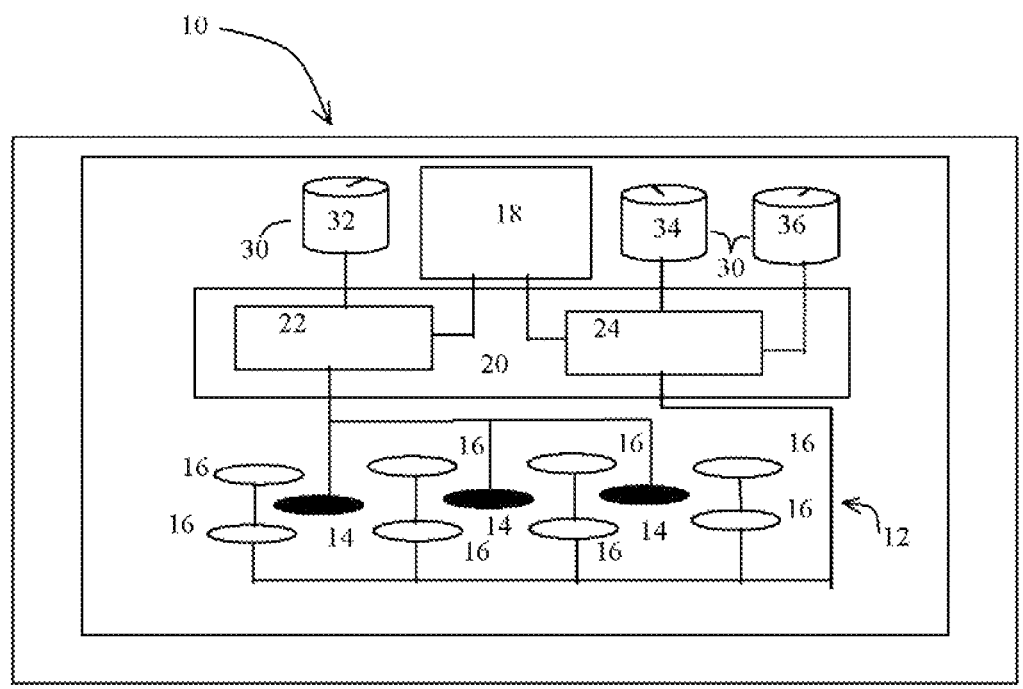

LIGHT EMITTING DIODE GROW LIGHT FOR PLANT GROWING APPLICATIONS

CROSS-REFERENCE TO RELATED APPLICATIONS

This application claims the benefit of and priority to prior filed provisional application Ser. No. 61/796,978, filed Nov. 27, 2012, the contents of which are incorporated herein by reference in their entirety.

FIELD OF TECHNOLOGY

An improved grow light for a plant using light emitting diodes (LEDs) and more particularly, an improved grow light and method of growing a plant by using light emitting diodes (LEDs).

BACKGROUND

Plants use photosynthesis to convert water and carbon dioxide to create organic compounds such as cellulose or glucose. It is well-established that artificial lights can be substituted for natural sunlight. In addition to conventional incandescent lights, High Intensity Discharge (HID) lamps, such as Metal Halide (MH) and High Pressure Sodium (HPS), have been used to grow plants. Fluorescent lamps are another example of artificial illumination used to grow plants. Some plant growers desire the ability to control the amount of light provided to the plant. HID and fluorescent lamps require an electronic ballast for operation, which makes controlling the light intensity a challenge.

Light emitting diodes (LEDs) are new a lighting technology in the grow light industry. LEDs emit light at specific wavelength bands depending upon the type of diode. Because of this narrow wavelength band a white LED is actually comprised of a mix of different color LEDs to create the white light. The intensity of an LED may be controlled as well. Therefore LEDs may be dimmed.

Like any other industry, the agricultural industry seeks to increase production and lower operating costs of its products. Generally, plants exposed to more blue light tend to grow stouter and with broader leads. Plants exposed to more red light tend to grow faster and taller but with thinner stems and smaller leaves.

Research has determined that the 660 nm wavelength is crucial to trigger flowering in a plant. In some plant species the 660 nm wavelength must not be present longer than 12 hours per day in order for the plant to flower and to continue to flower. The solution has been to provide illumination for less than 12 hours per day.

An exemplary embodiment may overcome these problems and provide a grow light where the 660 nm frequency band may be turned off.

SUMMARY

An apparatus for providing light to grow a plant comprises an LED array emitting blue light between about 350 nm and 500 nm, red light at about 630 nm and red light at about 660 nm. An input device for producing a 600_nm_ON command and a 660_nm_OFF command is in communication with a controller. The controller is in communication with the LED array and the input device. The controller responds to the 660_nm_ON command by causing the array to emit blue light between about 350 nm and 500 nm, red light at about 630 nm and a red light at about 660 nm and the controller responds to a 660_nm_OFF command by causing the array to emit blue light between about 350 nm and 500 nm and red light at about 630 nm. Additionally the LED array may include infrared light at 740 nm. The input device may also include a command to the controller to cause an increase or decrease in the intensity in any or all of the blue light, the 630 nm red light and the 660 nm red light.

In another embodiment the input device may execute a command to the controller to cause an increase or decrease to the intensity of the blue light with respect to the intensity of the 630 nm red light and the intensity of the 660 nm red light to be a ratio.

In another embodiment a grow light comprises an LED array for emitting blue light at a band between about 350 nm and 500 nm, red light at a band at about 630 nm and red light at a band at about 660 nm. At least one input device selectively controls the intensity of at least one light band. The controller is in communication with the LED array and the input device were the controller responds to a signal from the input device to command the array to change from a first state where the array emits light comprising a 660 nm band to a second state where the array emits light that does not comprise a 660 nm band. The LED array of the grow light may also include infrared light at a band at about 740 nm.

A method of providing light to a plant comprises providing an LED array adapted to emit blue light at a band between about 530 nm and 500 nm, red light at a band at about 630 nm and red light at a band at about 660 nm. The method further comprises conducting electrical power to the LED array to emit blue light at a band between about 350 nm and 500 nm, red light at a band at about 630 nm and red light and at a band about 660 nm and interrupting electrical power to the LEDs adapted to emit a 660 nm band within the LED array.

Further objects, features and advantages of the disclosed embodiments will become apparent to those skilled in the art from analysis of the following written description, the accompanying drawings and the appended claims.

BRIEF DESCRIPTION OF THE DRAWINGS

FIG. 1 is a block diagram of an embodiment of a grow light comprising an LED array.

DESCRIPTION OF THE PREFERRED EMBODIMENT

Traditionally agriculture has been performed under natural sunlight. Green plants use little light in the yellow and green part of the spectrum. Green plants reflect most of the yellow and green light which is why they appear green. Green plants primarily use blue light, which consists of light between 350 nm and 500 nm and red light, which is in the regions of 630 nm and 660 nm, during photosynthesis. There is some debate about what proportion of red to blue light is optimal for plant growth. NASA has indicated that the ratio may be 3 to 4:1. Accordingly, independent adjustment of the red and blue bands would provide advantages to growers in the area of power consumption and growth optimization.

With initial reference to FIG. 1, a block diagram of an embodiment of a grow light 10 comprising an LED array 12 is shown. The LED array 12 comprises blue LEDs 14 and red LEDs 16. The red LEDs 16 include red LEDs having a wavelength of about 630 nm and dark red LEDs having a wavelength of about 660 nm. Although not shown, the LED array 12 may be further comprised of an infrared LED having a wavelength of about 740 nm.

A controller 20 is in communication with the LED array 12 and an input device 30. In one embodiment input device 30 includes blue control input 32 red control input 34 and dark red control input 36. The blue control input 32 governs the blue light at a band between about 350 nm and 500 nm and modulates the power supplied to the blue LEDs 14 between 0% and 100%. The red control input 34 governs the red light band at about 630 nm and modulates the power supplied to the red LEDs 16 between 0% and 100%. The dark red control input 36 governs the dark red light band at about 660 nm and modulates the power supplied to the dark red LEDs 16 between 0% and 100%.

The input device 30 may be user selectable and the control inputs 32-36 may be controlled by manual knobs or by pulse width modulation. The timing of the power supplied to the LEDs may also be electronically controlled, for example by a timer or a timing circuit.

A power supply 18 provides electrical power to the controller 20. Signals from the input device 30 govern how much power is supplied to the LEDs 16, 18 within the array 12.

In one embodiment an apparatus 10 provides light to grow a plant, comprising an LED array 12 for emitting blue light between about 350 nm and 500 nm, red light at about 630 nm and red light at about 660 nm. An input device 30 produces a 660_nm_ON command and a 660_nm_OFF command. The 660 nm ON command and a 660 nm OFF command modulate the dark red 660 nm band on or off, respectively.

A controller 20 is in communication with the LED array 12 and the input device 30. The controller responds to the 660_nm_ON command by causing the array 12 to emit blue light between about 350 nm and 500 nm, red light at about 630 nm and red light, at about 660 nm. The controller 20 responds to the 660_nm_OFF command by causing the array 12 to emit blue light between about 350 nm and 500 nm and red light at about 630 nm, meaning the 660 nm red light is off. The LED array 12 may include infrared light at 740 nm. The input device 30 may further includes a command to the controller 20 to cause an increase or decrease to the intensity of said blue light. The input device 30 may further include a command to the controller 20 to cause an increase or decrease to the intensity of the 630 nm red light. The input device 30 further includes a command to the controller 20 to cause an increase or decrease to the intensity of said 660 nm red light. The input device 30 further includes a command to the controller 20 to cause an increase or decrease to the intensity of said 740 nm infrared light.

The input device 30 further includes a control input to execute a command to the controller 20 to cause an increase or decrease to the intensity of the blue light, an increase or decrease to the intensity of the 630 nm red light, an increase or decrease to the intensity of 660 nm red light, and an increase or decrease to the intensity of said of the 740 nm infrared light.

The input device 20 further includes a command to the controller 30 to cause the intensity of the blue light with respect to the intensity of the 630 nm red light and the intensity of the 660 nm red light to be a ratio.

In one embodiment, the grow light 10 comprises an LED array 12 for emitting blue light at a band between about 350 nm and 500 nm, red light at a band at about 630 nm and red light at a band at about 660 nm. The controller 20 is in communication with the LED array 12 and input device 30. The input device 30 selectively controls the intensity of at least one light band. The controller 20 responds to a signal from the input device 30 to command the array 12 to change from a first state where the array 12 emits light comprising a 660 nm band to a second state where the array 12 emits light that does not comprise a 660 nm band. In one embodiment, the grow light 10 comprises array 12 that includes infrared light at a band at about 740 nm.

The grow light 10 comprises an device 30 includes a signal to command an increase or decrease to the intensity of the blue light band. In still another alternative embodiment, the input device 30 includes a signal to command an increase or decrease to the intensity of the 630 nm red light band. In still another alternative embodiment, input device 30 includes a signal to command an increase or decrease to the intensity of the 740 nm infrared light band. In still another alternative embodiment, input device 30 includes a signal to command an increase or decrease to the intensity of the blue light band, an increase or decrease to the intensity of the 630 nm red light band, an increase or decrease to the intensity of the 660 nm red light band, and an increase or decrease to the intensity of the 740 nm infrared light band. In still another alternative embodiment, input device 30 further includes a signal to command the intensity of the blue light band with respect to the intensity of the 630 nm red light band and the intensity of the 660 nm red light band to be a ratio.

In operation, the grow light 10 provides light to a plant by the LED Array 12 that emits blue light at a band between about 350 nm and 500 nm, red light at band at about 630 nm and red light at a band at about 660 nm. The power supply 18 conducts electrical power to the controller 20, which receives signals from the input device 30 to command the LED array 12 to emit blue light at a band between about 350 nm and 500 nm, red light at band at about 630 nm and red light at a band at about 660 nm. The input device 30 produces a command for interrupting electrical power to the LEDs 16 that emit a 660 nm band within the LED array 12. In one operational embodiment, the LED array 12 emit infrared light at a 740 nm band.

The input device 30 is capable of modulating the electrical power to the array 12 to increase or decrease the intensity of the blue light band, increase or decrease to the intensity of the 630 nm red light band, increase or decrease to the intensity of the 660 nm red light and, and an increase or decrease the intensity of the 740 nm infrared light band. The input device 30 may command the controller 20 to interrupt electrical power to the LEDs 16 to turn off the 660 nm band within the LED array 12 for more than 12 hours out of a 24 hour period.

The foregoing discussion discloses and describes the preferred structure and control system for the present embodiment. However, one skilled in the art will readily recognize from such discussion, and from the accompanying drawings and claims, that various changes, modifications and variations can be made therein without departing from the true spirit fair scope of the embodiment.

What is claimed is:

1. Apparatus for providing light to grow is plant, comprising:
   an LED array for emitting blue light between about 350 nm and 500 nm, red light at about 630 nm and red light at about 660 nm;
   an input device for producing a 660_nm_ON command and a 660_nm_OFF command;
   a controller in communication with said LED array and said input device, said controller responding to: (1) the 660_nm_ON command by causing said array to emit blue light between about 350 nm and 500 nm, red light at about 630 nm and red light at about 660 nm, and (2) the 660_nm_OFF command by causing said array to emit blue light between about 350 nm and 500 nm and red light at about 630 nm.

2. The apparatus for providing light to grow a plant as set forth in claim 1, wherein said LED array includes infrared light at 740 nm.

3. The apparatus for providing light to grow a plant as set forth in claim 2, wherein said input device further includes a command to said controller to cause an increase or decrease to the intensity of said 740 nm infrared light.

4. The apparatus for providing light to grow a plant as set forth in claim 1, wherein said input device further includes a command to said controller to cause an increase or decrease to the intensity of said blue light.

5. The apparatus for providing light to grow a plant as set forth in claim 1, wherein said input device further includes a command to said controller to cause an increase or decrease to the intensity of said 630 nm red light.

6. The apparatus for providing light to grow a plant as set forth in claim 1, wherein said input device further includes a command to said controller to cause an increase or decrease to the intensity of said 660 nm red light.

7. The apparatus for providing light to grow a plant as set forth in claim 1, wherein said input device further includes a command to said controller to cause an increase or decrease to the intensity of said blue light, an increase or decrease to the intensity of said 630 nm red light, an increase or decrease to the intensity of said 660 nm red light, and an increase on decrease to the intensity of said of said 740 nm infrared light.

8. The apparatus for providing light to grow a plant as set forth in claim 1, wherein said input device further includes a command to said controller to cause the intensity of said blue light with respect to the intensity of said 630 nm red light and the intensity of said 660 nm red light to be a ratio.

9. A grow light, comprising:
   an LED array for emitting blue light at a band between about 350 nm and 500 nm, red light at a band at about 630 nm and red light at a band at about 660 nm;
   at least one input device for selectively controlling the intensity of at least one light band; and
   a controller in communication with said LED array and said input device, said controller responding to a signal from said input device to command said array to change from a first state where said array emits light comprising a 660 nm band to a second state where said array emits light that does not comprise a 660 nm band.

10. The grow light as set forth in claim 9, wherein said LED array includes infrared light at a band at about 740 nm.

11. The grow light as set forth in claim 10, wherein said input device further includes a signal to command an increase or decrease to the intensity of said 740 nm infrared light band.

12. The grow light as set forth in claim 9, wherein said input device further includes a signal to command an increase or decrease to the intensity of said blue light band.

13. The grow light as set forth in claim 9, wherein said input device further includes a signal to command an increase or decrease to the intensity of said 630 nm red light band.

14. The grow light as set forth in claim 9, wherein said input device further includes a signal to command an increase or decrease to the intensity of said 660 nm red light band.

15. The grow light as set forth in claim 9, wherein said input device further includes a signal to command an increase or decrease to the intensity or said blue light band, an increase or decrease to the intensity of said 630 nm red light band, an increase or decrease to the intensity of said 660 nm red light band, and an increase or decrease to the intensity of said of said 740 nm infrared light band.

16. The grow light as set forth in claim 9, wherein said input device further includes a signal to command the intensity of said blue light band with respect to the intensity of said 630 nm red light band and the intensity of said 660 nm red light band to be a ratio.

17. A method of providing light to a plant, comprising:
   providing an LED array adapted to emit blue light at a band between about 350 nm and 500 nm, red light at band at about 630 nm and red light at a band at about 660 nm;
   conducting electrical power to the LED array to emit blue light at a band between about 350 nm and 500 nm, red light at band at about 630 nm and red light at a band at about 660 nm; and
   interrupting electrical power to the LEDs adapted to emit a 660 nm band within the LED array.

18. The method of providing light to a plant as set forth in claim 17, wherein the LED array is further adapted to emit infrared light at 740 nm band.

19. The method of providing light to a plant as set forth in claim 18, further including the step of modulating the electrical power to the array to increase or decrease the intensity of the blue light band, increase or decrease to the intensity of the 630 nm red light band, increase or decrease to the intensity of the 660 nm red light and, and an increase or decrease the intensity of the 740 nm infrared light band.

20. The method of providing light to a plant an set forth in claim 17, wherein electrical power to the LEDs adapted to emit a 660 nm band within the LED array is interrupted more than 12 hours out of a 24 hour period.

* * * * *